United States Patent [19]

Schulte et al.

[11] 4,098,851
[45] Jul. 4, 1978

[54] DEVICE FOR MIXING GASES AND LIQUIDS

[75] Inventors: Franz-Josef Schulte, Leverkusen; Werner Bruch, Dormagen; Erwin Diers, Opladen, all of Fed. Rep. of Germany

[73] Assignees: Erdölchemie Gesellschaft mit beschränkter Haftung, Cologne; Bayer Aktiengesellschaft, Leverkusen, both of Fed. Rep. of Germany

[21] Appl. No.: 708,824

[22] Filed: Jul. 26, 1976

Related U.S. Application Data

[63] Continuation of Ser. No. 546,831, Feb. 3, 1975, abandoned.

[30] Foreign Application Priority Data

Feb. 20, 1974 [DE] Fed. Rep. of Germany ....... 2408064

[51] Int. Cl.² ............................ C02B 3/08; C02C 5/04
[52] U.S. Cl. ......................................... 261/76; 261/77; 261/DIG. 75
[58] Field of Search ................... 261/76, 77, DIG. 75; 239/416, 417, 434

[56] References Cited

U.S. PATENT DOCUMENTS 141,361   7/1873   Korting ................. 261/76

FOREIGN PATENT DOCUMENTS 971,536   1/1951   France ................... 261/76
878,949   10/1961  United Kingdom ............ 261/76

Primary Examiner—William A. Cuchlinski, Jr.
Assistant Examiner—Gregory N. Clements
Attorney, Agent, or Firm—Burgess, Dinklage & Sprung

[57] ABSTRACT

The invention relates to a device for mixing gases and liquids which has an intense mixing effect and is very easy to clean. The device comprises a housing with feed pipes for gas and liquid, into which an injector nozzle is inserted and a mixing nozzle is screwed.

3 Claims, 1 Drawing Figure

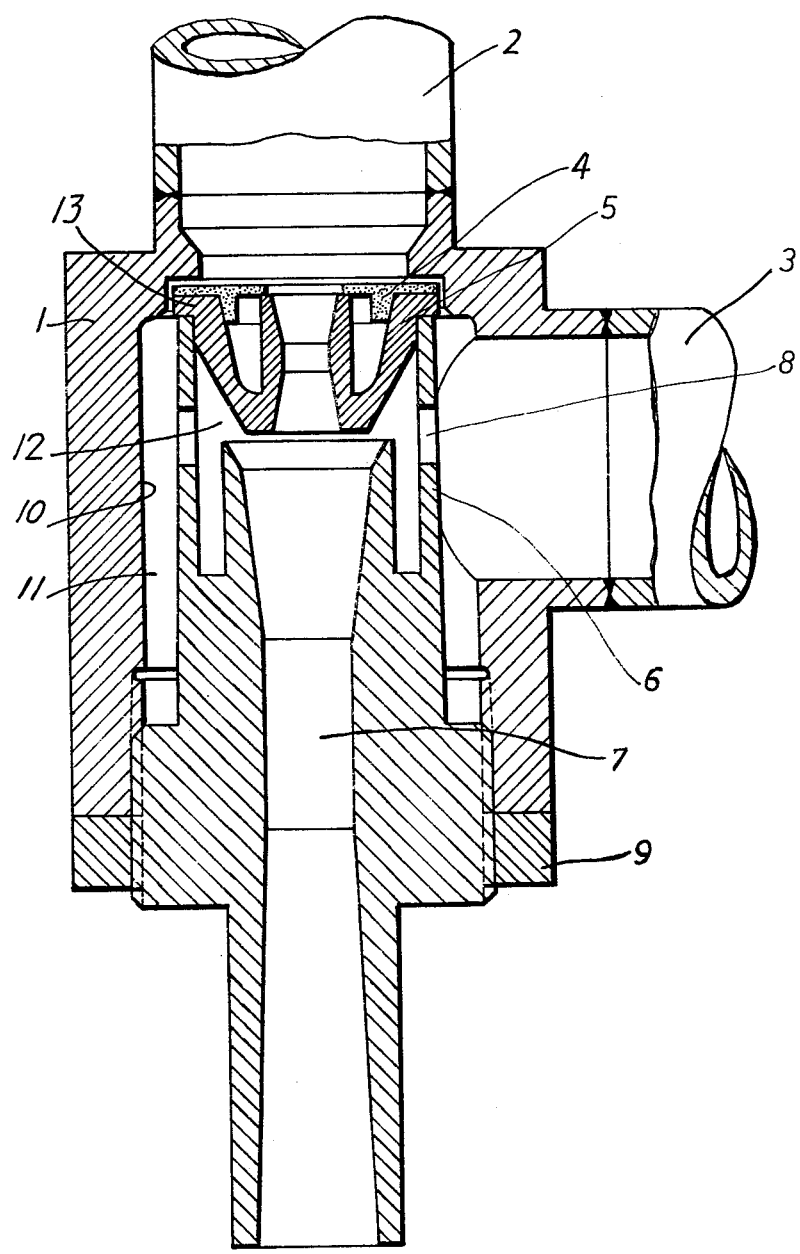

DEVICE FOR MIXING GASES AND LIQUIDS

This is a continuation of application Ser. No. 546,831 filed Feb. 3, 1975, now abandoned.

Gases have to be introduced into liquids for a wide variety of reasons, for example for accelerating or stopping reactions in chemical processes, or for promoting the growth of or for killing microorganisms in biological processes.

It is known that these requirements can be fulfilled by using ejector nozzles. In conventional ejector nozzles, which are preferably made of metal, all the individual components such as, for example, the injector nozzle and mixing nozzle and all the connections are provided with screw threads. This is a practicable solution in cases where clean media are used, but it is not suitable where gas is to be introduced into a heavily contaminated liquid, for instance in the treatment of sewage. The screw threads are fouled to such an extent that they can only be released with considerable effort, in addition to which the internal components of these ejectors have a pronounced tendency to become encrusted with solids.

The object of the present invention is to provide a device for mixing gases and liquids which can readily and rapidly be dismantled, even in cases where heavily contaminated liquids are used, and which does not show any tendency towards internal encrustation.

According to the invention, this object is achieved by virtue of the fact that a housing is fixedly connected to a feed conduit for liquids and to a feed conduit for gases; a seal is inserted into the housing at the outlet of the liquid feed conduit; an insertable injector nozzle is pressed against the seal; a tubular shroud which is fixedly connected to a mixing nozzle designed to be screwed into the housing and which is provided with bores, is mounted on the edge of the injector nozzle; and a lock nut is arranged at the end of the housing.

The particular advantage of the device according to the invention is that a very good liquid/gas mixing effect is obtained by virtue of the fact that the gas is uniformly distributed throughout the entire mixing nozzle through the bores in the tubular shroud. Because the injector nozzle is pressed against a seal, liquid is prevented from entering the gas feed conduit. The mixing device designed to be welded in between the feed lines is particularly easy to clean because, after the lock nut has been released, the mixing nozzle and the tubular shroud fixed to it can be simply unscrewed and the wedged-in injection nozzle withdrawn at the same time.

A preferred embodiment of the device according to the invention is described in detail in the following with reference to the accompanying drawing, which is a cross-section through a mixing device.

An injector nozzle 5 is inserted into a housing 1, which has a bore 10 and can be made, for example, of a plastics material. A seal 4 is inserted between the flange 13 of the injector nozzle 5 and the inlet liquids, which are delivered through a feed-pipe 2 into the mixing device. This seal 4 prevents liquid from penetrating into the vicinity of the feed pipe 3 for gases. Both the liquid feed pipe 2 and the gas feed pipe 3 can be welded to the housing 1 of the mixing device. A mixing nozzle 7 is fixedly connected to a tubular shroud 6 which serves to define within the housing, outer chamber 11 and inner chamber 12. when the mixing nozzle 7 is screwed into the housing 1, the injector nozzle 5 is pressed firmly against the seal 4 by the tubular shroud 6. Bores 8 are formed in the tubular shroud 6 over its entire periphery at the level of the gas feed pipe 3. The effect of these bores is that the gases introduced are supplied to the mixing nozzle in uniformly distributed form. A lock nut 9 prevents the mixing nozzle from loosening once it has been screwed in.

What we claim is:

1. A device for mixing a gas and a liquid comprising: a housing and a bore therethrough; a liquid feed conduit connected to the housing at the upstream end portion of the housing and in communication with the bore; a tubular shroud within the housing to define within the bore an outer chamber and an inner chamber in alignment with the liquid feed conduit, a mixing nozzle integral and concentric with the shroud, the shroud projecting upstream of the mixing nozzle, the mixing nozzle including external threads engaging said housing so that the mixing nozzle is held in alignment with the liquid feed conduit and spaced apart therefrom for being supplied with liquid by the liquid feed conduit; an injector nozzle disposed within the housing bore and having an inlet fed by the conduit and an outlet projecting into the inner mixing chamber adjacent to the inner end of the mixing nozzle; said injector nozzle being friction fit within the upstream end of the shroud; a gas feed conduit connected to the housing and communicating with the outer chamber; and means defining an array of apertures in the tubular shroud to allow gas supplied from the gas feed conduit to the outer chamber to be substantially uniformly distributed by the apertures into the inner chamber; whereby the mixing nozzle, shroud and injector nozzle can be unscrewed from the housing as a unit by means of the threads, and the injector nozzle can thereafter be simply pulled out from the shroud for ease of disassembly.

2. A device according to claim 1, wherein a sealing member is positioned at the inlet face of the injector nozzle and is centrally apertured to allow the flow of liquid therethrough.

3. A device according to claim 1, wherein the mixing nozzle is locked in position in the housing by a lock nut which is internally screw-threaded to cooperate with the externally screw-threaded portion of the nozzle.